United States Patent Office.

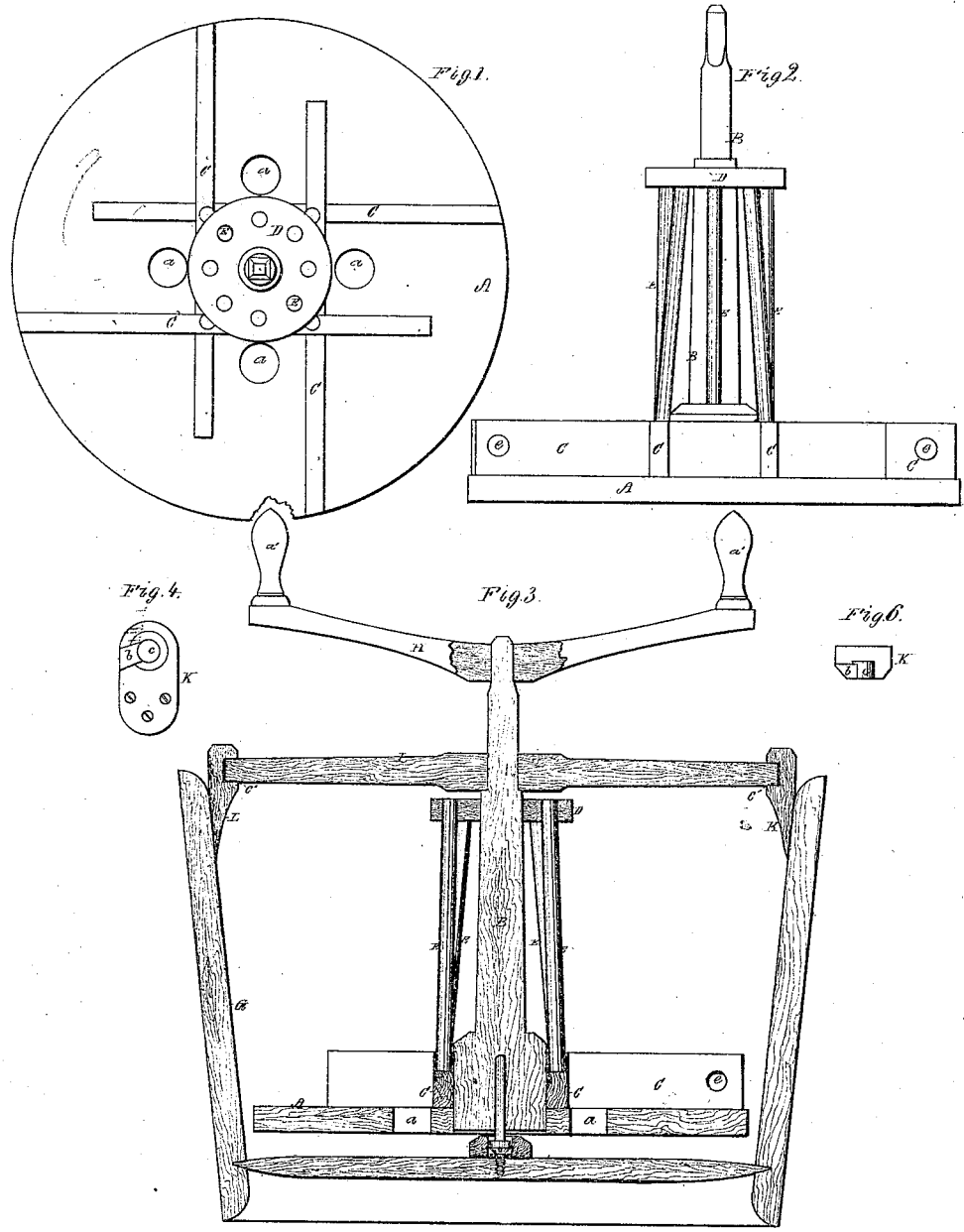

RUSSELL S. MORSE, OF CHELSEA, MASSACHUSETTS.

Letters Patent No. 106,853, dated August 30, 1870.

IMPROVED WASHING-MACHINE.

The Schedule referred to in these Letters Patent and making part of the same.

*To all persons to whom these presents may come:*

Be it known that I, RUSSELL S. MORSE, late of Wilton, of the State of Maine, but now of Chelsea, of the State of Massachusetts, have invented a new and useful Improvement in Washing-Machines; and do hereby declare the same to be fully represented in the accompanying drawing, and to be described as follows:

Of such drawing—

Figure 1 is a top view;

Figure 2, a side elevation of the dasher; and

Figure 3 is a transverse section of my improved washing-machine.

In such drawing—

A denotes a perforated disk, having not only a round shaft, B, projecting upward from its center, but a series of prismatic arms or slats C C, &c., arranged on its top, and extended therefrom and formed in manner as shown.

The perforations of the disk are exhibited at $a\ a$ as arranged between the arms, and near their junctions.

It will be observed that such arm is at right angles to two others, and extends beyond them in opposite directions, one end of the arm terminating at or close to the periphery of the disk, while the opposite end of the arm is placed at a distance of about half the length of the arm from the next adjacent part of the periphery.

This arrangement of the arms and the disk is very useful, as in practice the arms so disposed will operate so as to aid in preventing the clothes in the tub of the dasher from being moved toward and piled about the shaft, as the centrifugal force generated in the water, and tending to throw it upward at the sides of the tub, will be met and counteracted by lateral currents or forces induced in the water by the arms.

From the series of arms there is extended upward, to a disk or circular head, D, arranged on the shaft, as represented, a series of round bars, E E E, they being arranged at equal, or about equal, distances apart. Their purpose is to aid in washing the clothes, and imparting to them reciprocating rotary motions within the tub G, within which the dasher is arranged, and to which it is pivoted, so as to be capable of being moved therein with a reciprocating rotary movement by a person when hold of the handles $a'\ a'$ of a lever, H, placed upon the upper prismatic part of the dasher-shaft.

The said shaft has a bearing in a cross-bar, I, whose opposite ends are inserted in socket-pieces K L, projecting upward from the upper part of the tub.

One of the socket-pieces, (viz., K,) is provided with a port or passage, $b$, leading out of its socket laterally, but having a depth less than that of the socket, the same being as shown in Figure 4, which is a front view, and in Figure 5, which is a side view, and in Figure 6, which is a horizontal section of the socket-piece, the socket being shown at $c$.

The other socket-piece, L, has simply a round recess or socket, $c'$, made in it to receive the end of the cross-bar.

The distance between the bottoms of the two sockets, when attached to the tub, is to be equal, if not a little greater than the length of the bar I, but the distance from the bottom of the entrance passage $b$ to the bottom of the socket of the opposite socket-piece is to be somewhat less than the length of the bar I, the whole being to enable the said bar, after having one end inserted in the socket $c'$ of the last-mentioned socket-piece, to have its other end passed through the passage $b$, and sprung into the socket of the other socket-piece, the inherent elasticity of the tub and the bar enabling such to be effected. This mode of applying the bar to the tub admits of their being easily separated when occasion may require.

The advantages of having the perforation of the disk arranged close about the shaft is, that they enable the water to operate to better advantage by centrifugal force, to prevent deposits of dirt and extraneous matters beneath the disk.

One or more holes, $e$, may be made laterally through each arm near its outer end.

I therefore claim as my improvement in a washing-machine—

The disk A, with its holes $a\ a$, arms $c$, and the series of bars E, combined and arranged relatively to each other, and with the shaft B, as and to operate in the tub in the manner as explained and represented, the disk and arms under such arrangement being extended horizontally beyond the series of bars E, and combined therewith, so as to revolve with them in one and the same direction, all as shown and described.

RUSSELL S. MORSE.

Witnesses:
R. H. EDDY,
J. R. SNOW.